United States Patent [19]

Slocumb

[11] 4,272,468

[45] Jun. 9, 1981

[54] METHOD FOR REDUCING THE AGING PERIOD OF POLYETHYLENE FOAMS

[75] Inventor: Robert C. Slocumb, New Brighton, Minn.

[73] Assignee: Conwed Corporation, St. Paul, Minn.

[21] Appl. No.: 49,627

[22] Filed: Jun. 18, 1979

Related U.S. Application Data

[63] Continuation-in-part of Ser. No. 866,504, Jan. 3, 1978, abandoned, which is a continuation-in-part of Ser. No. 773,873, Mar. 2, 1977, abandoned.

[51] Int. Cl.³ ............................................. B29D 27/00
[52] U.S. Cl. .................................. 264/53; 264/210.7; 264/DIG. 15
[58] Field of Search ......... 264/53, 210.7, 51, DIG. 15

[56] References Cited

U.S. PATENT DOCUMENTS

| | | | |
|---|---|---|---|
| 3,248,462 | 4/1966 | Merrill et al. | 264/53 |
| 3,275,720 | 9/1966 | Ohsol | 264/210.7 X |
| 3,466,356 | 9/1969 | Carlson et al. | 264/210.7 X |
| 3,488,746 | 1/1970 | Gilbert | 264/53 |
| 3,558,532 | 1/1971 | Sundquist et al. | 264/53 X |
| 4,150,077 | 4/1979 | Slocumb | 264/DIG. 15 |

OTHER PUBLICATIONS

Encyclopedia of Polymer Science and Technology, vol. 2, 1965 pp. 344-373.
Collins, F. H. "Controlled Density Polystyrene Foam Extrusion" In *SPE Journal*, Jul. 1960, pp. 705-709.

*Primary Examiner*—Philip Anderson
*Attorney, Agent, or Firm*—Eyre, Mann, Lucas & Just

[57] ABSTRACT

A method for reducing the aging period of foams produced using a gaseous expansion agent is disclosed which includes biaxial orientation of the thermoplastic polymer foam. The foam is cooled after it is extruded and blown up from a tubular die, the cooling being to a temperature at least 40° C. below its melting point. Thereafter, the foam is biaxially oriented to a dimension at least 25% greater in both radial and axial directions than the dimensions of the extruded, blown up, cooled foam.

9 Claims, No Drawings

METHOD FOR REDUCING THE AGING PERIOD OF POLYETHYLENE FOAMS

The present application is a continuation-in-part of Application Ser. No. 866,504 filed Jan. 3, 1978, now abandoned which in turn was a continuation-in-part of Application Ser. No. 773,873 filed Mar. 2, 1977 now abandoned.

The present invention relates to a method for reducing the aging period of foams produced using a gaseous expansion agent.

The production of polyethylene foams, is quite well known in the art. They are normally formed by injecting under pressure a volatile hydrocarbon, typically halogenated hydrocarbons into a molten resin, typically a polyolefin whereafter the mixture is extruded as a tube to ambient temperature. As the molten resin is extruded to ambient conditions, foaming of the resin mass takes place. Since the molten resin is under a good deal of pressure in the extruder, the foam tube expands as it is extruded. The degree of expansion is referred to as the blow-up ratio and is normally on the order of 3-5 times the diameter of the annular extrusion die. The extruded foam is also usually pulled away from the extrusion orifice and this, in combination with the radial expansion of the tube, also tends to expand the tube along its axial length. After this expansion process, the tube is cooled, suitably by travel over a cooling mandrel and then through an ambient zone.

Due to the migration of the blowing agent (gaseous expansion agent) through the cell walls of the foam, the foam will usually shrink within about 24 hours. This shrinkage will typically be in the range of 40% to 80% of the original foam volume depending upon the original foam density of the extruded material. If the thus shrunk foam is permitted to age, i.e., not used but rather stored in a room where air is available, after a period of time the foam will recover approximately 90% to 95% of its original volume. Unfortunately, it normally takes up to six weeks for the foam to properly age. It is quite apparent that this involves a substantial investment in terms of storage space, work in progress and the like. Obviously any method which will reduce the aging period is highly desirable.

In accordance with the present invention, it has been found that the aging period for thermoplastic polymer foams produced using a gaseous expansion agent, such as polyolefin foams, can be substantially reduced when the foam is biaxially oriented after it is extruded, blown-up, and cooled. Biaxial orientation of the foam also increases its tensile strength and its ability to recover from compression. Although the exact reasons why biaxial orientation will reduce the aging time for the foams are not known, it is believed that orientation of the foam aligns the molecules along the axes of orientation which imparts improved memory to the foam along the axes of orientation and thus assists in recovery of the foam during the aging process.

The biaxial orientation is effected after the completion of the blow-up. The blow-up occurs immediately upon extrusion and is completed at temperatures near the melting point of the material. In accordance with the present invention the blown-up tube is cooled to a temperature at least about 40° C. below its melting point and then, after it has been so cooled, it is biaxially oriented.

Biaxial orientation of the foam may be accomplished in one direction at a time or in both directions simultaneously. Orientation may be accomplished either in-line or off-line. By biaxial orientation it is meant that the extruded, cooled foam is stretched in two directions, the second of which is essentially normal to the first. It is preferred that the foam be stretched in each direction to a dimension at least 25% greater than its original extruded dimension. There is no real upper limitation on the degree of orientation but, as a practical matter so that the foam does not become too thin for standard commercial uses, an upper limit of about 75% is preferred. It is most preferred that the degree of biaxial orientation be from about 30% to about 50% in each direction, i.e., radial and axial.

In accordance with a preferred embodiment of the invention, a polyolefin, preferably polyethylene or polypropylene foam is biaxially oriented to substantially reduce the aging period of the foam. The polyolefin foam is extruded as a tube and blown-up in known manner, is cooled to at least 40° C. below its melting point, and is then biaxially oriented to a dimension at least 25% greater than its original dimension in both circumferential (radial) and linear (axial) dimension. Biaxial orientation of the foam may suitably be accomplished by pulling the extrudate at an accelerated rate over a mandrel which is at least 25% greater in radial dimension than the dimension of the blown-up, cooled tube. Details of such an apparatus are well known to those skilled in the art. The extrudate may be oriented at ambient temperatures and pressures. However, it is preferred that the foam be reheated to a point just below its cloud point for best operation.

Specific examples of the invention are set forth below. These examples are illustrative and are not to be understood as limiting the scope of the invention in any way.

EXAMPLE I

Polyethylene foam was formed from extruded polyethylene resin and blowing agent Freon 11 in known manner. The extruded tube was expanded over a mandrel and had a blow-up ratio of about 3. After cooling to ambient temperature (about 20° C., a temperature substantially more than 40° C. below the melting point of polyethylene), a portion of the extruded polyethylene foam was biaxially oriented to a degree of about 33% one direction at a time. After complete biaxial orientation of the foam, it was allowed to age at ambient temperature and at atmospheric pressure without biaxial orientation. After two weeks, after three weeks, and after eight weeks, the dimensions of the oriented and unoriented foams were measured. The percentage changes of the dimensions of the foams from the two and three week periods to the eight week period are given in the Table below under the heading "Example I". In preparing the Table, the dimensions for the two and eight week periods and the three and eight week periods were formed and converted to percentages.

EXAMPLE II

Polyethylene foam was formed and dimensions measured as in Example I except that Freon 12 was used as the blowing agent. The percentage changes are given in the Table under the heading "Example II".

EXAMPLE III

Polyethylene foam was formed with a different polyethylene resin from that of Example I but using the same blowing agent. The dimensions were measured as in Example I. The percentage changes are given in the Table under the heading "Example III".

TABLE

| Foam | Time Period | Dimensional Percentage Change | | |
|---|---|---|---|---|
| | | Example I | Example II | Example III |
| Oriented | 2 weeks/8 weeks | 0.05 | 0.05 | 0.15 |
| Unoriented | 2 weeks/8 weeks | 1.20 | 0.40 | 0.92 |
| Oriented | 3 weeks/8 weeks | 0.0 | 0.02 | 0.0 |
| Unoriented | 3 weeks/8 weeks | 0.80 | 0.30 | 0.30 |

A comparison of the dimensional changes between the oriented and unoriented foams shows that the aging time of the biaxially oriented foam has been substantially reduced and, in some cases, the biaxially oriented foam was completely aged after only three weeks whereas this was never the case where the foam was not biaxially oriented.

While the description of the preferred embodiment and examples has been limited to polyethylene foam, it is to be understood that it is intended that all thermoplastic polymer foams and, in particular, polyolefin foams are to be covered by the disclosure and claims hereof. Furthermore, while the description has been in terms of a tube it will be understood that the sheet can be slit longitudinally and be opened up to a flat sheet before orientation. Suitable apparatus for biaxially orienting a polymer sheet are well known in the art, see for example the various methods taught in the *Encyclopedia of Polymer Science and Technology*, Volume 2, 1965, at pages 344–373. It will further be understood that when the terms "radial" or "circumferential" or the terms "axial" or "longitudinal" are used herein with respect to a tube they mean "width" and "length" respectively when used in connection with a sheet of material.

While it is somewhat self-evident that there is little or no advantage to biaxial orientation in terms of reduced aging time after 8 weeks have elapsed since most foams will already have reached dimensional stability by that time, it is pointed out that as a practical matter it is preferred to carry out the biaxial orientation within about 2 weeks of extrusion and, as previously mentioned, it is most preferred that it be carried out in a single in-line process with extrusion.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. A process for reducing the aging period of a thermoplastic polymer foam melt extruded and blown-up from a tubular die under pressure and intimately admixed with a gaseous expansion agent, said process comprising:
    (a) cooling the extruded, blown-up foam to a temperature at least 40° C. below its melting point and, thereafter within a period of time of not more than about two weeks,
    (b) biaxially orienting the foam to a dimension at least 25% greater in both radial and axial directions than the dimensions of the extruded, blown-up, cooled foam.

2. The process of claim 1 wherein the degree of orientation in each direction is from about 30% to about 50%.

3. The process of claim 1 wherein the thermoplastic polymer is a polyolefin.

4. The process of claim 3 wherein the polyolefin is a polyethylene.

5. The process of claim 1 wherein the biaxial orientation is carried out in an in-line process with the extrusion.

6. The process of claim 1 wherein the biaxial orientation is carried out in an off-line process from the extrusion.

7. The process of claim 6 wherein the extruded, cooled foam tube is slit to form a foam sheet before the step of biaxial orientation.

8. A process for reducing the aging period of a polyethylene foam melt extruded and blown-up from a tubular die under pressure and intimately admixed with a gaseous expansion agent, said process comprising:
    (a) cooling the extruded, blown-up tubular polyethylene foam to a temperature at least 40° C. below its melting point and, immediately thereafter, in-line with the extrusion;
    (b) biaxially orienting the tubular polyethylene foam to a dimension at least 25% greater in both radial and axial directions than the dimensions of the extruded cooled foam.

9. A process for reducing the aging period of a thermoplastic polymer foam melt extruded and blown-up from a tubular die under pressure and intimately admixed with a gaseous expansion agent, said process comprising:
    (a) cooling the extruded, blown-up foam to about ambient temperature and, thereafter within a period of time of not more than about two weeks,
    (b) heating the extruded foam and biaxially orienting the foam to a dimension at least 25% greater in both radial and axial directions than the dimensions of the extruded, blown-up, cooled foam.

* * * * *